(12) United States Patent
Svartström et al.

(10) Patent No.: US 11,614,236 B2
(45) Date of Patent: Mar. 28, 2023

(54) HEATING CHAMBER OF AN OUTDOOR STOVE (71) Applicant: Primus AB, Örnsköldsvik (SE)

(72) Inventors: Eric Svartström, Solna (SE); Staffan Till, Solna (SE); Magnus Johansson, Solna (SE)

(73) Assignee: Primus AB, Örnsköldsvik (SE)

( * ) Notice: Subject to any disclaimer, the term of this patent is extended or adjusted under 35 U.S.C. 154(b) by 270 days.

(21) Appl. No.: 16/796,691

(22) Filed: Feb. 20, 2020

(65) Prior Publication Data

US 2020/0263875 A1  Aug. 20, 2020

(30) Foreign Application Priority Data

Feb. 20, 2019 (EP) ..................................... 19158210

(51) Int. Cl.
| | | |
|---|---|---|
| *F24C 13/00* | (2006.01) | |
| *F24C 1/16* | (2021.01) | |
| *F23N 1/08* | (2006.01) | |
| *F24H 1/06* | (2022.01) | |

(Continued)

(52) U.S. Cl.
CPC ................. *F24C 1/16* (2013.01); *A47J 27/21* (2013.01); *A47J 36/26* (2013.01); *F23N 1/087* (2013.01); *F24C 13/00* (2013.01); *F24H 1/06* (2013.01); *F23N 2239/02* (2020.01); *F23N 2239/04* (2020.01); *F23N 2239/06* (2020.01); *F23N 2241/04* (2020.01)

(58) Field of Classification Search
CPC .... F24C 1/16; F24C 13/00; F24C 3/14; F24C 5/20; F24H 1/06; F23N 2239/02; F23N 2239/06; F23N 2239/04; F23N 2241/04; A47J 27/21; A47J 36/26; F24B 1/183; F24B 9/04
USPC .................................................. 126/9 R, 9 B
See application file for complete search history.

(56) References Cited

U.S. PATENT DOCUMENTS

| | | | | |
|---|---|---|---|---|
| 103,558 | A | * 5/1870 | Burnap .................... | A47J 36/26 126/266 |
| 175,263 | A | * 3/1876 | Sullivan ................... | A47J 36/26 126/266 |

(Continued)

FOREIGN PATENT DOCUMENTS

| | | | | |
|---|---|---|---|---|
| AU | 2011374309 A2 | * | 1/2014 | ............. A47J 31/401 |
| CA | 2842603 A1 | * | 2/2013 | ............. A47J 31/401 |

(Continued)

OTHER PUBLICATIONS

"JP_2002130820_A_I—Machine Translation.pdf", machine translation, Japan Platform for Patent Information, Mar. 2, 2022. (Year: 2022).*

(Continued)

*Primary Examiner* — Steven B McAllister
*Assistant Examiner* — Daniel E. Namay
(74) *Attorney, Agent, or Firm* — TraskBritt (57) ABSTRACT Heating chamber for a portable stove comprises a fixation mechanism for securing, in a leak-free manner, a container such as a bottle to a first surface of the heating chamber; one or more compartments fillable with liquid, typically water, dispensed from the container; a pressure compensation valve; and an outlet configured to release the liquid from the heating chamber.

18 Claims, 6 Drawing Sheets

(51) Int. Cl.
*A47J 27/21* (2006.01)
*A47J 36/26* (2006.01)

(56) References Cited

U.S. PATENT DOCUMENTS

| | | | | | |
|---|---|---|---|---|---|
| 218,950 | A | * | 8/1879 | Fifield | F24C 1/16 126/258 |
| 327,278 | A | * | 9/1885 | Leach | F24C 1/16 126/258 |
| 334,747 | A | * | 1/1886 | Clarke | F24C 3/14 126/378.1 |
| 504,358 | A | * | 9/1893 | Manguine | A47J 36/26 126/266 |
| 747,010 | A | * | 12/1903 | Smith | F24C 3/14 126/260 |
| 1,129,714 | A | * | 2/1915 | Oaks | A47J 36/26 126/266 |
| 1,437,073 | A | * | 11/1922 | Popper | A47J 36/26 126/43 |
| 2,391,460 | A | * | 12/1945 | Howard | F24C 1/16 126/339 |
| 2,502,434 | A | * | 4/1950 | Creitz | F24B 1/202 126/262 |
| 4,105,013 | A | | 8/1978 | Vache | |
| 4,739,747 | A | * | 4/1988 | Johnson | F24C 1/16 126/271.1 |
| 4,834,065 | A | * | 5/1989 | McQuade | F24C 1/16 220/373 |
| 4,860,726 | A | * | 8/1989 | Barker | F24C 1/16 126/208 |
| 5,056,424 | A | * | 10/1991 | Lai | A47J 33/00 220/756 |
| 5,284,126 | A | * | 2/1994 | Varney | F24C 1/16 126/29 |
| 5,363,977 | A | * | 11/1994 | Hoff | F25D 3/08 220/4.27 |
| 6,929,002 | B1 | * | 8/2005 | Adrian | F24H 1/06 220/521 |
| 6,941,677 | B2 | * | 9/2005 | Adrian | F24H 3/087 34/79 |
| 7,257,321 | B2 | * | 8/2007 | Kaastra | A47J 27/21 392/459 |
| 7,506,386 | B1 | * | 3/2009 | Adrian | F24H 1/06 122/18.1 |
| 8,887,322 | B1 | * | 11/2014 | Adrian | F24H 1/08 122/18.1 |
| 10,203,116 | B2 | * | 2/2019 | Kuhn | A47J 36/34 |
| 10,215,449 | B2 | * | 2/2019 | Welles | A47J 36/26 |
| 2003/0056390 | A1 | * | 3/2003 | Adrian | F24H 3/087 34/79 |
| 2004/0011350 | A1 | * | 1/2004 | Dowst | A47J 27/022 126/344 |
| 2006/0162571 | A1 | * | 7/2006 | Dowst | A47J 36/26 99/279 |
| 2007/0000906 | A1 | * | 1/2007 | Kaastra | A47J 27/21 219/441 |
| 2011/0253068 | A1 | * | 10/2011 | Iskrenovic | F24H 1/06 122/4 R |
| 2014/0311475 | A1 | * | 10/2014 | Dowst | F23D 11/445 126/25 R |
| 2017/0219214 | A1 | * | 8/2017 | Kuhn | F24C 1/16 |

FOREIGN PATENT DOCUMENTS

| | | | | |
|---|---|---|---|---|
| CN | 107847072 A | * | 3/2018 | ........... A47J 31/002 |
| FR | 0722174 A | | 3/1932 | |
| JP | 2002-130820 A | | 5/2002 | |
| JP | 2009106780 A | * | 5/2009 | ........... A47J 27/022 |
| JP | 2012-106003 A | | 6/2012 | |
| JP | 2012106003 A | * | 6/2012 | ........... A47J 27/022 |
| JP | 2019-006404 A | | 1/2019 | |
| JP | 2020048721 A | * | 4/2020 | ........ A47J 27/21025 |
| WO | 2004/000082 A2 | | 12/2003 | |
| WO | 2012/076845 A2 | | 10/2012 | |

OTHER PUBLICATIONS

JP_2012106003_A_I—Machine Translation.pdf, machine translation, Japan Platform for Patent Information, Mar. 3, 2022. (Year: 2022).*

JP_2019006404_A_I—Machine Translation.pdf, machine translation, Japan Platform for Patent Information, Mar. 3, 2022. (Year: 2022).*

European Communication for European Application No. 19158210.5 dated Sep. 29, 2021, 11 pages.

Japanese Notification of Reason for Rejection for Japanese Application No. 2020-025842 dated Aug. 2, 2021, 4 pages.

European Search Report for European Application No. 19158210 dated Jul. 17, 2019, 6 pages.

* cited by examiner

HEATING CHAMBER OF AN OUTDOOR STOVE

PRIORITY CLAIM

This application claims the benefit of the filing date of European Patent Application Serial No. 19158210.5, filed Feb. 20, 2019, for "Heating Chamber of an Outdoor Stove," the contents of which are incorporated herein in their entirety.

TECHNICAL FIELD

The present disclosure relates to the field of outdoor stoves, such as campfire stoves, expedition stoves and trekking stoves, and in particular a heating chamber for such stoves.

BACKGROUND

Classical outdoor stoves and cookers usually provide pot supports, e.g., grids, and some fuel providing means having a control knob to adjust the flame. However, these classical outdoor stoves need an external pot, etc., which is separate and which is placed on the heater, filled with water which then is heated. The heated water may be used for preparing hot beverages such as coffee, tea or herbal infusion, or to prepare freeze-dried food, e.g., soups, etc.

However, this classical setup has the problem that the stove always needs a separate pot or kettle or the like. In addition, it may take some time to prepare the hot water due to the arrangement and the size of the pot or kettle. In addition, the flow of fuel, such as gas should be easily controllable.

BRIEF SUMMARY

In view of the above, the present disclosure provides an alternative solution to the above-mentioned limitations.

The disclosure provides: a heating chamber for a portable stove comprising a fixation mechanism for securing, in a leak-free manner, a container such as a bottle to a first surface of the heating chamber; one or more compartments fillable with liquid, typically water, dispensed from the container; a pressure compensation valve; and an outlet configured to release the liquid from the heating chamber.

Here, the one or more compartments are compartments inside the heating chamber. For example, the volume of the heating chamber may be separated by separation layers. For example, if there are n compartments, where n is a positive integer, there would be n−1 separating layers. The fixation mechanism should secure the container to the first surface of the heating chamber, e.g., the top of the heating chamber. Securing may be understood as locking, screwing, or coupling. The pressure compensation valve should ensure pressure equilibration with the surrounding environment. The outlet serves for the user to release the liquid, e.g., water, from the heating chamber, e.g., after heating, to be able to use the liquid for preparing hot food or beverages.

The heating chamber as described above may further have a non-return valve for getting air into the container when liquid is dispensed from the container into the heating chamber when the container is connected to the heating chamber.

The non-return valve should provide that air could get into the container, e.g., a bottle, while the liquid, e.g., water, is released from the container. It should be understood, that the container might not necessarily need to have a lid. In that case, it may be sufficient to just attach a burner part of the portable stove upside down on top of a filled bottle. Once attached, the bottle together with the burner unit are turned around, again.

The heating chamber as described above may further comprise a surface part placeable on a support for the heating chamber, the support comprised in a burner part of the portable stove.

For example, a user may place the heating chamber onto a burner unit of the portable stove. The burner unit may comprise a support for the heating chamber, wherein the support typically fits the dimensions of the heating chamber. The heating chamber may thus have a surface part, for instance a bottom part, with which it can be placed onto the support of burner unit of the portable stove. The heating chamber may then rest on the support at least during the heating process, e.g., boiling water.

The heating chamber as described above may further comprise a plurality of compartments each fillable with liquid dispensed from the container, the compartments may be connected by connecting means, such as through holes or conduits, configured to transport the liquid between the compartments; in particular wherein the compartments stacked vertically one onto another.

In particular, more than one compartments may be present inside heating chamber. The liquid, e.g., water, from the container may fill several of the compartments. The compartments may be similar in size and/or shape and/or volume. In particular, the compartments may be stacked, in particular vertically stacked. Here, vertically should be understood as referring to a vertical axis through the support of the portable stove, the heating chamber, and the container when all three are set up for use by a user. The vertically stacked compartments may be connected by through holes or conduits such that liquid and/or vapor may be exchanged between the compartments. In such a case, the pressure compensation valve may then serve to compensate pressure for the entire system of stacked compartments inside the heating chamber.

In the heating chamber as described above, one or more, or all of the compartments, may have a bottom part inclined with respect to the surface part of the heating chamber; wherein the connecting means are provided at the deepest position of the compartments, respectively.

The inclined bottom of the respective compartment may facilitate exchange of liquid between the compartments; in particular, it may facilitate leaking of liquid from an upper compartment of the stack towards a lower compartment of the stack, with respect to the vertical axis, under the influence of gravity and/or vapor pressure. Particularly, the connecting means of one compartment may be positioned at a deepest position of the compartment, respectively.

In the heating chamber as described above the outlet, may comprise a control valve or faucet for controlling releasing at least a portion of the liquid from the heating chamber, typically after heating, the outlet may be connectable to a flexible pipe or tube.

The control valve or faucet may serve for releasing, i.e., filling at least a portion of the liquid, in particular the heated liquid from the heating chamber into a mug, a cup, a bowl or the like. The control valve or faucet may be configured to allow a controlled filling of heated water from the heating chamber. For easier use, a flexible pipe or tube may be connected to the outlet.

In the heating chamber as described above, the fixation mechanism may comprise a releasable flange or screw threads configured for receiving a corresponding fixation means, such as an interface, of the container.

The disclosure further provides a container module for a portable stove, the container being a bottle made from heat-resistant material such as glass, ceramics, stainless steel, durable plastics; aluminum, titanium, and bio-based plastics; the container comprising an interface for releasably leak-free docking of the container to a first surface of a heating chamber for a portable stove, particularly the container being docked upside-down with respect to the heating chamber.

In the container module as described above, the interface may comprise screw threads for screwing the container to the heating chamber; in particular the interface being comprised in a lid of the container.

The container module may be a bottle filled with cold water. For interfacing the container module, e.g., the bottle with water, the container may comprise at its orifice an interface. The interface may be part of the lid of the container or may be provided separately.

In the container module as described above, the interface may be pluggable for leak-free plugging of the container to a first surface of a heating chamber for the portable stove.

The interface may be pluggable by a non-return valve of the heating chamber, when the container module is set up onto the heating chamber.

The disclosure further provides a portable stove comprising a heating chamber as described above; in particular, the portable stove being an expedition stove, a trekking stove or a camping stove.

The disclosure further provides a burner module for a portable stove for heating a liquid in a heating chamber for the portable stove, the heating chamber as described above; the burner module comprising a support configured to support a heating chamber; in particular the burner module being configured to burn various kinds of fuel such as LPG, hydrocarbon gases, gasoline/petrol, diesel, kerosene/paraffin; and may further comprise a cartridge connector connectable with a fuel cartridge, or a fuel tank fillable with liquid or gaseous or solid fuel.

The burner module as described above may further comprise a switching means such as a switch or a button, and an ignition unit, together being configured to start the flow of fuel and to ignite the fuel substantially simultaneously once the switching means is actuated, e.g., by a user; and configured to stop the flow of fuel once the switching means is released, or actuated, again.

The disclosure further provides a kit of a portable outdoor stove, the kit comprising a portable stove as described above, a container module as described above, and a burner module as described above.

The kit thus provides a complete set of equipment for a portable outdoor stove, including the heating chamber, the container module, the portable stove having the support and the burner module.

DETAILED DESCRIPTION

Figure 1A:
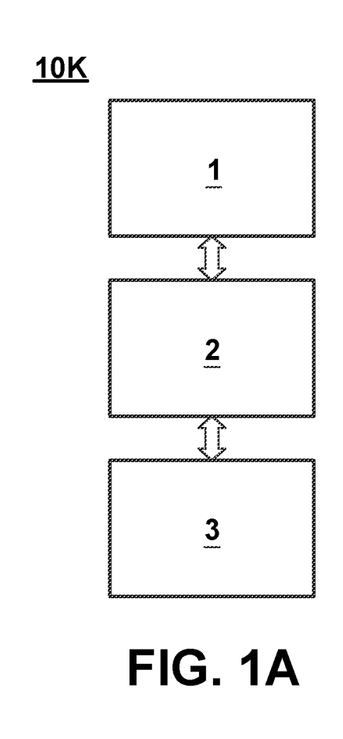
FIG. 1A: Schematic view of the three major units of a kit of a portable outdoor stove.
Figure 1B:
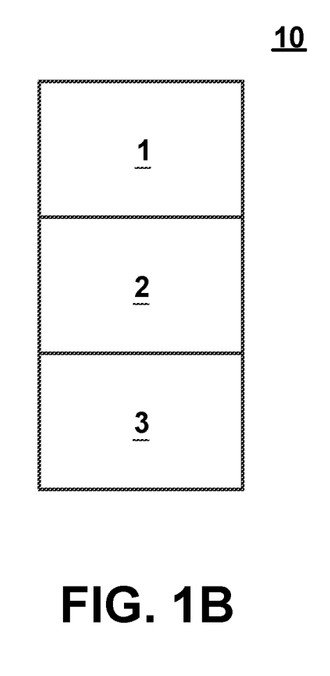
FIG. 1B: Schematic view of the assembled portable outdoor stove of FIG. 1A.

FIG. 1A depicts a schematic view of the units of a kit 10K for a portable outdoor stove. These units are a container module (1), a heating chamber (2) and a burner module (3). FIG. 1B depicts a schematic view of an assembled portable outdoor stove 10, which may be built from the building blocks of the kit 10K of FIG. 1A. The units of the outdoor stove are the same as in FIG. 1A and therefore have the same reference numerals. These units will be further described, below.

Figure 2:
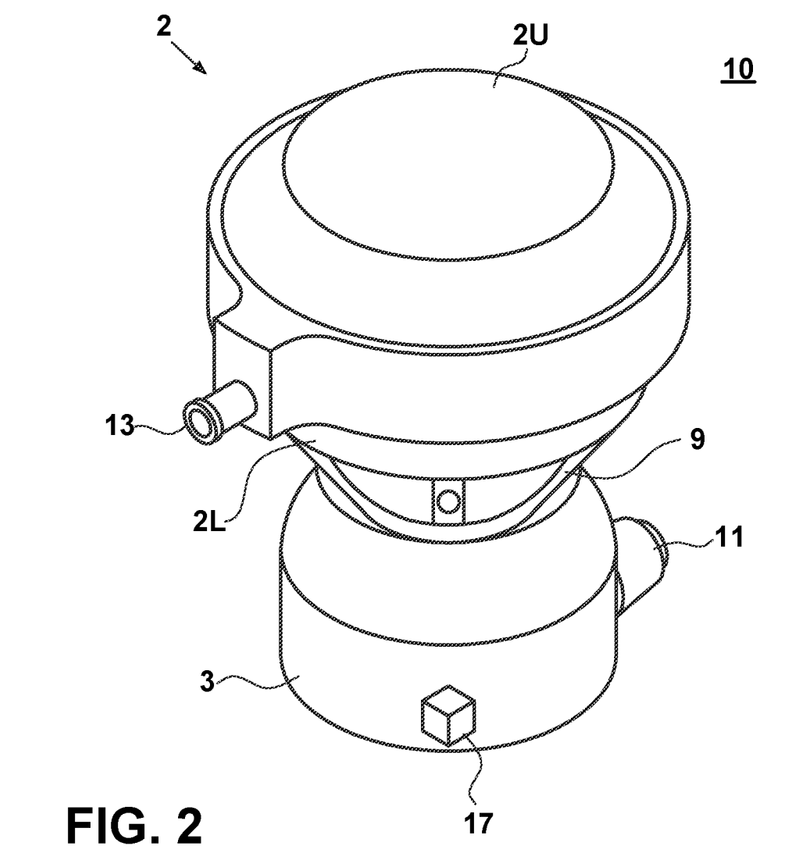
FIG. 2: Schematic view of a heating chamber for a portable outdoor stove.

FIG. 2 depicts a heating chamber 2 for a portable outdoor stove 10. The heating chamber 2 may be the same as described with respect to FIGS. 1A and 1B. The heating chamber 2 shown in FIG. 2 is shown a being placed on a support 9 of burner module 3. As indicated from FIGS. 1A and 1B, the heating chamber 2 is placeable on the support 9 of the burner module 3. It should be understood, that the support 9 might include a locking mechanism or fastening mechanism for locking or fastening the heating chamber 2 to the support 9, if necessary. FIG. 2 mainly depicts the outer shape of the heating chamber 2. The shape of the heating chamber 2 defines a volume adapted to contain a liquid such as water for heating of the liquid. Any inlet means of the heating chamber will be discussed with respect to FIGS. 3A, 3B, and 4-6 and are not shown in FIG. 2. FIG. 2 however depicts an outlet means, e.g., an outlet 13, configured to release the liquid, be it hot or cold, from the heating chamber 2. Typically, the outlet 13 is or comprises a pressure valve that opens when the temperature and pressure is high enough. While not shown in FIG. 2, it should be understood that the outlet 13 might comprise a control valve or faucet for controlling releasing of at least a portion of the liquid from the heating chamber 2, typically after heating. In addition, the outlet 13, which is or comprises the pressure valve may be connected with a flexible pipe or tube.

FIG. 2 also indicates a surface 2U of the heating chamber 2. The surface 2U may be shaped to receive a container module 1 to be connected to the heating chamber 2. Details of a possible connection will be discussed with respect to FIGS. 3A and 3B. The surface 2U may be substantially flat or may have a slightly concave shape but other shapes may be possible, as well. Substantially opposite to the upper surface 2U, a lower surface 2L is shown. The lower surface 2L in FIG. 2 is facing towards the burner unit 3.

FIG. 2 also depicts a burner module or burner unit 3. The burner unit 3 includes a support 9 adapted to support a heating chamber 2 as discussed above. For instance, a bottom part of the heating chamber 2 may be directly placed onto the support 9 of burner unit 3 of the portable stove 10. The heating chamber 2 may then rest on the support 9 at least during the heating process, e.g., heating or boiling water. The burner unit 3 typically includes a fuel regulation means or a fuel regulation valve 11 configured to adjust the throughput, i.e., the amount of fuel to be used for heating purposes. The burner module 3 may include a burner or burning part being configured to burn various kinds of fuel such as gas, gasoline/petrol, diesel, and kerosene/paraffin. The burner module 3 may further comprise a cartridge connector connectable with a fuel cartridge (both not shown), or a fuel tank Tillable with liquid or gaseous or solid fuel. The fuel to be used with the burner module should be considered to be well understood.

Further, the burner module 3 of FIG. 2 shows a switching means such as a switch or a button 17. Together with an ignition unit (not shown) the switching unit being configured to start the flow of fuel and to ignite the fuel substantially simultaneously once the switching means is actuated. The actuation may include a user pressing the switching means, i.e., the button or switch. The button 17 may be a push-button or a switch. As such, it may be configured to stop the flow of fuel once the switching means is released, or actuated, again, or if it is a push-button, once the push-button is actuated, again.

Figure 3A:
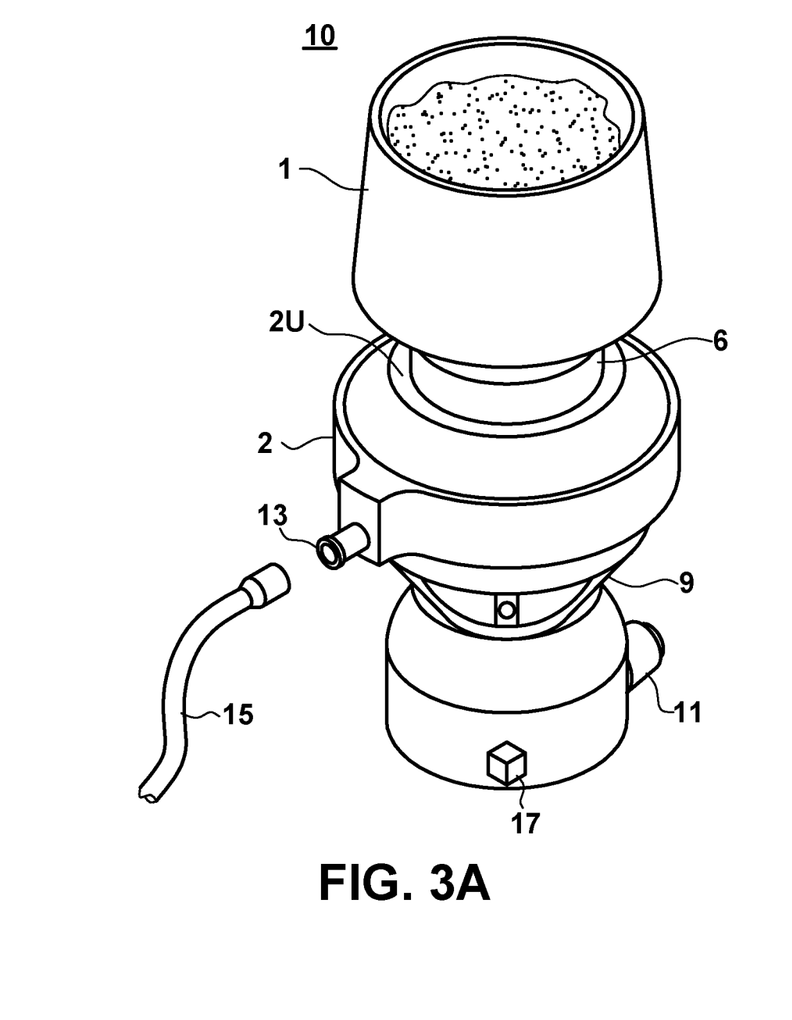
FIG. 3A: Schematic view of a portable outdoor stove.

FIG. 3A depicts the units depicted in FIG. 2 together with a container module 1 to show three units of a portable outdoor stove 10, cf. FIGS. 1A and 1B. In FIG. 3A, the same elements as shown in FIG. 2 are denoted with the same reference numerals, in particular, the heating chamber 2 and the burner unit 3 are the same as shown in FIG. 2. FIG. 3A shows a tube 15 that may be connected to the outlet 13, i.e., the pressure valve.

FIG. 3A further discloses a container module 1 being shown in a connected state with respect to the heating chamber 2 of the portable outdoor stove 10. Connection or docking of the container module 1 is shown on at least parts of the upper surface 2U of the heating chamber 2, i.e., the surface 2U facing away from the burner module 3 which is, with the support shown on a surface 2L substantially opposite to the surface 2U of the heating chamber 2. The container module 1 may be a bottle or the like and may have a bottle-like shape. FIG. 3A further indicates a collar of the container module 1 adapted for connecting the container module 1 to the heating chamber 2 on the side of the surface 2U, i.e., the upper surface of the heating chamber 2 in FIG. 3A. The collar may comprise an interface 6 for releasably leak-free docking the container to the upper, i.e., first surface 2U of the heating chamber 2 of the portable stove 10. As is further shown in FIG. 3A, the container module 1 is docked upside-down with respect to the heating chamber 2. This may help emptying the container module 1, and also provides for the interface for connecting to the heating chamber 2 being provided in the vicinity of the interface 6, i.e., the orifice of the container.

Figure 3B:
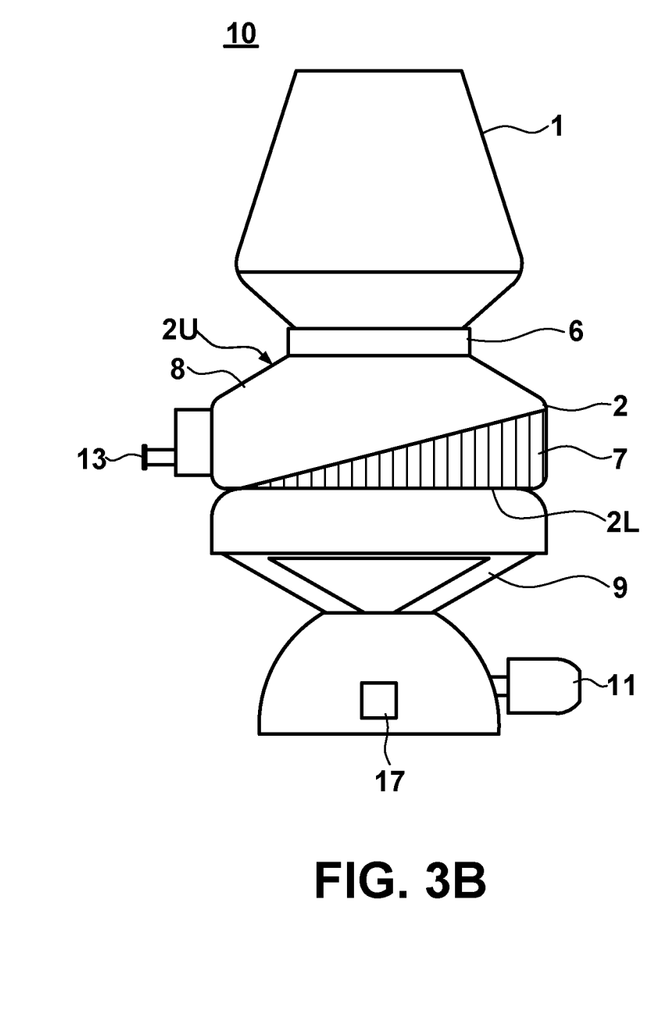
FIG. 3B: A different view of the portable outdoor stove of FIG. 3A.

FIG. 3B depicts further details of the heating chamber 2 of FIG. 3A. In FIG. 3B, the heating chamber 2 includes a compartment 8 with an inclined bottom part 7. The inclined bottom part 7 of the compartment 8 is inclined with respect to the lower surface part 2L of the heating chamber 2. That is, as already indicated in FIGS. 1B, 2, and 3A, the lower surface part 2L may be substantially parallel to fit to the support 9 of the burner unit 3. For example, this might be a substantially flat surface 2L. The bottom part 7 of the compartment 8 may be inclined by an angle. The angle may be between 8-12 degrees, typically about 10 degrees. In particular, the heating chamber 2 may comprise several compartments that may be substantially similar to the compartment 8. Typically, these compartments 8 may be stacked. Some or all of the compartments 8 may have an inclined bottom part 7. This may facilitate leaking of liquid from an upper compartment of the stack towards a lower compartment of the stack, with respect to the vertical axis, under the influence of gravity and/or vapor pressure.

Figure 4:
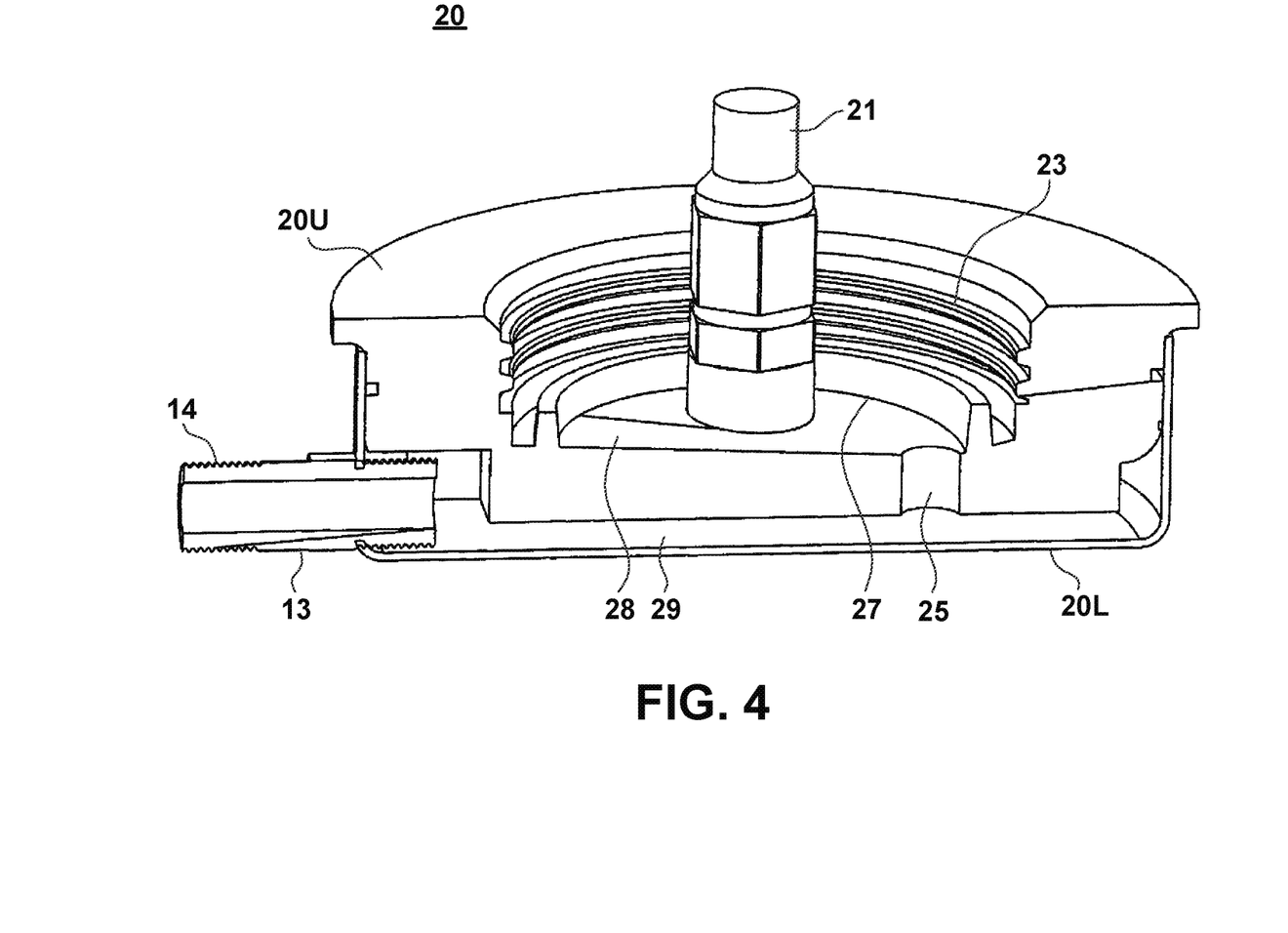
FIG. 4: Detailed view of parts of a heating chamber.

FIG. 4 depicts a heating chamber 20, which may be similar to the heating chamber 2 of FIGS. 1A-3B. The heating chamber 20 may include an upper compartment 27 and a lower compartment 29 which are stacked onto each other. Here, the terms "upper" and "lower" refer to the upper compartment being further away from a burner unit (not shown) but closer to a container module (not shown), and the lower compartment being closer to a burner unit (not shown) but further away from a container module (not shown). The upper compartment 27 is further depicted having an inclined bottom part 28. The inclined bottom part 28 may facilitate leaking of liquid from the upper compartment 27 of the stack towards the lower compartment 29 of the stack, with respect to the vertical axis of the heating chamber 20, e.g., under the influence of gravity and/or vapor pressure.

FIG. 4 further shows a connecting means 25 for fluidly connecting the upper compartment 27 and the lower compartment 29. The connecting means 25 may be a through hole or a conduit. The connecting means shown in FIG. 4 is adapted to transport or at least to allow transport of the liquid between the compartments 27 and 29, respectively; in particular when the compartments 27 and 29 stacked vertically one onto another. Typically, the connecting means may be provided at the deepest (lowest) position of the compartments, respectively, wherein the lowest position of the respective compartment should be understood as the position within the compartment being closest to the lower surface 20L of the heating chamber 20. It should be understood that if there are more than two compartments 8 vertically stacked onto each other, the lowest position of a specific compartment stacked directly above another compartment may be connected with a corresponding position of the other compartment directly below the specific compartment. The corresponding position may be the highest point of the other compartment.

FIG. 4 further depicts that the pressure valve 13, which may be substantially the same as the outlet shown in FIGS. 2-3B, may be threaded, here showing male threads 14. The threads 14 will provide a proper connection of a tube or a conduit to the pressure valve 13.

In FIG. 4, the heating chamber 20 shows an upper surface 20U. In FIG. 4, the heating chamber 20 has a symmetrical shape of a hollow cylinder. Thus, the surface 20U is symmetrically arranged with respect to the symmetry axis of the hollow cylinder. The hollow cylinder has an inner annular part exhibiting threads, i.e., female threads, 23 adapted for having a corresponding container module threaded to the heating chamber for securing the container (not shown). Further, around the symmetry axis, i.e., vertical axis of the heating chamber 20, the heating chamber 20 may include a non-return means, e.g., a non-return valve 21. The non-return valve 21 allows air to flow into the container when liquid, e.g., water, is dispensed out from the heating chamber 20, in particular, into the lower compartment 29. It should be noted, that containers without lids might be used, as well. For instance, the burner part with the heating chamber 20 may be put upside down on top of a filled bottle. The filled bottle may then be screwed to the threads 23 of the heating chamber. Once fastened, the bottle now being connected to the heating chamber 20, together with the heating chamber 20 may be turned around, again.

Figure 5:
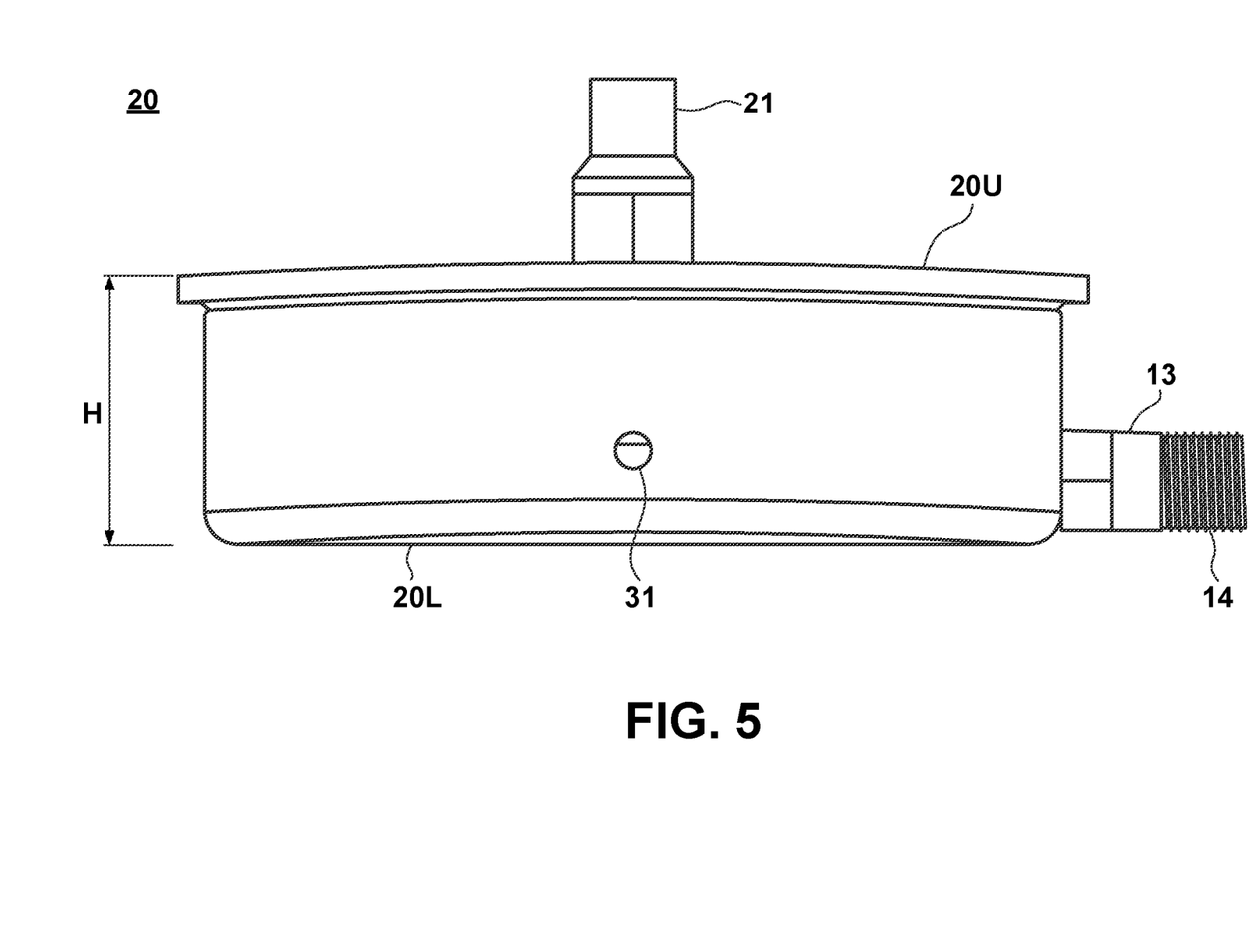
FIG. 5: Another detailed view of parts of the heating chamber according to FIG. 4.
Figure 6:
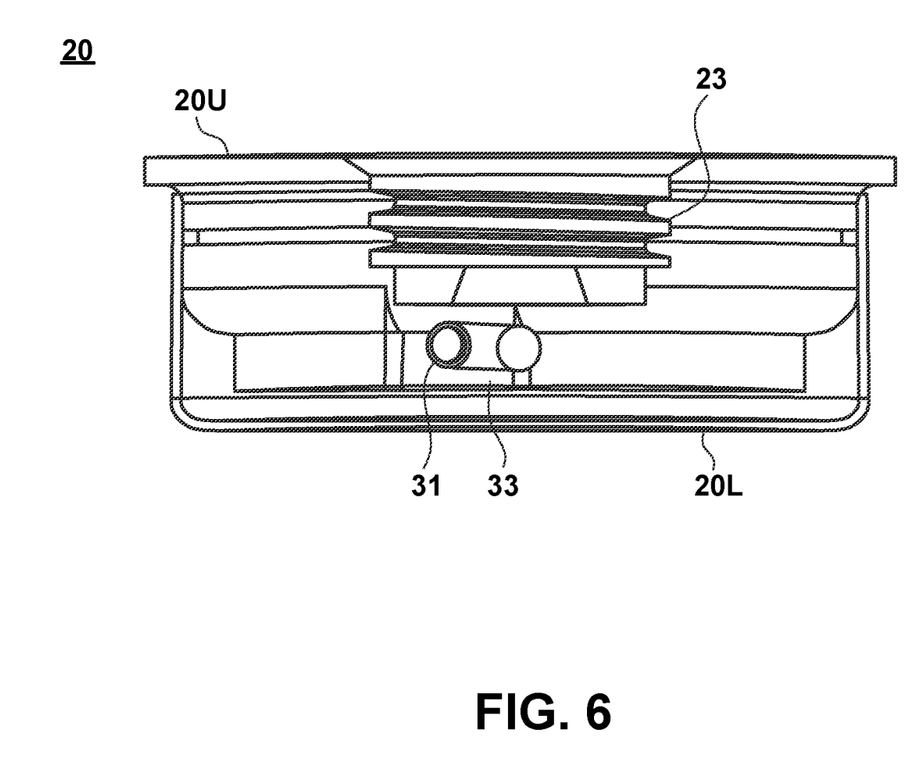
FIG. 6: A cross-sectional view of the heating chamber of FIGS. 4 and 5.

FIG. 5 depicts a further view of the heating chamber 20 as described with respect to FIG. 4. FIG. 5 indicates the non-return valve 21 towering the vertical height H of the heating chamber 20. Further, the pressure valve 13 and its threads 14 are shown. FIG. 5 further shows a pressure compensation valve or venting valve 31 configured to provide pressure compensation with respect to the interior, i.e., the compartments of the heating chamber 20. The compartments may correspond to the compartments 27 and 29 as shown in FIG. 4. The pressure compensation valve 31 may comprise a valve and a conduit 33 arranged perpendicular to the symmetry axis of the heating chamber 20, as shown in FIG. 6. The conduit 33 may have a length at least allowing it to reach the upper compartment 27. Depending on applications, more than pressure compensation valve may be provided. The non-return valve 21 is not shown in FIG. 6.

What is claimed is:

1. A heating chamber for a portable stove, comprising:
   a fixation mechanism for securing, in a leak-free manner, a container to a first surface of the heating chamber;
   a pressure compensation valve;
   an outlet configured to release liquid from the heating chamber;
   a plurality of compartments each fillable with liquid dispensed from the container, the compartments connected by connecting means configured to transport the liquid between the compartments;
   wherein the compartments are stacked vertically one onto another; and
   wherein at least one of the compartments has an inclined bottom surface, and wherein the connecting means are located at a deepest position of the at least one of the compartments.

2. The heating chamber of claim 1, wherein the outlet comprises a pressure valve.

3. The heating chamber of claim 1, further comprising a non-return valve configured for allowing air flow into the container when liquid is dispensed from the container into the heating chamber when the container is connected to the heating chamber.

4. The heating chamber of claim 1, further comprising a surface configured to be placed on a support for the heating chamber, the support being part of a burner of the portable stove.

5. The heating chamber of claim 1, wherein the outlet comprises a control valve or faucet for controlling release of at least a portion of the liquid from the heating chamber, the outlet configured to be connected to a flexible pipe or tube.

6. The heating chamber of claim 1, wherein the fixation mechanism comprises a releasable flange or screw threads configured for receiving a corresponding fixation means, such as an interface, of the container.

7. A portable stove comprising a heating chamber according to claim 1.

8. A burner module for a portable stove for heating a liquid in a heating chamber according to claim 1, the burner module comprising a support configured to support the heating chamber, and a cartridge connector connectable with a fuel cartridge or a fuel tank fillable with liquid, gaseous, or solid fuel.

9. The burner module of claim 8, wherein the burner module is configured to burn a fuel selected from among the group consisting of liquid petroleum gas, hydrocarbon gas, gasoline, petrol, diesel, kerosene, and paraffin.

10. The burner module of claim 8, further comprising a switching means and an ignition unit together being configured to start the flow of fuel and to ignite the fuel substantially simultaneously upon actuation of the switching means by a user, and configured to stop the flow of fuel upon release of the switching means or re-actuation of the switching means by a user.

11. The burner module of claim 10, wherein the switching means comprises a switch or a button.

12. A portable outdoor stove kit, the kit comprising a portable stove comprising a heating chamber according to claim 1, and a burner module comprising a support configured to support the heating chamber, and a cartridge connector connectable with a fuel cartridge or a fuel tank fillable with liquid, gaseous, or solid fuel.

13. The portable outdoor stove kit of claim 12, further comprising a container module for a portable stove, the container module comprising a bottle made from heat-resistant material, the container module comprising an interface for releasably leak-free docking the container module to the first surface of the heating chamber of the portable stove.

14. The portable outdoor stove kit of claim 13, wherein the container module is configured to dock upside down with respect to the heating chamber.

15. The portable outdoor stove kit of claim 13, wherein the heat-resistant material is selected from the group consisting of glass, ceramic, stainless steel, durable plastic, aluminum, titanium, and bio-based plastics.

16. The portable outdoor stove kit of claim 13, wherein the interface comprises screw threads for screwing the container to the heating chamber.

17. The portable outdoor stove kit of claim 16, wherein the interface is comprised in a lid of the container.

18. The portable outdoor stove kit of claim 13, wherein the interface is pluggable for leak-free plugging of the container to the first surface of the heating chamber for the portable stove.

* * * * *